United States Patent Office 3,173,899
Patented Mar. 16, 1965

3,173,899
CATALYTIC PROCESS FOR THE POLYMERIZATION OF TETRA-SUBSTITUTED β-LACTONES
Raymond Donald Clark, Kingsport, Tenn., assignor to Eastman Kodak Company, Rochester, N.Y., a corporation of New Jersey
No Drawing. Filed May 9, 1961, Ser. No. 108,737
7 Claims. (Cl. 260—78.3)

This invention relates to the polymerization of unsaturated β-lactones. More particularly, this invention relates to the polymerization of tetra-substituted β-lactones to form poly(enol esters). In a specific aspect, this invention relates to the polymerization of 2,2,4,4-tetraalkyl-3-hydroxy-3-butenoic acid β-lactones in the presence of strongly basic catalysts.

In copending application Serial No. 108,741, to George O. Cash, Jr., and James C. Martin, filed concurrently herewith, there is disclosed and claimed thermally stable, macromolecular, highly crystalline, high melting poly(enol esters) consisting essentially of units having the formula:

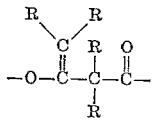

wherein the R groups are the same or different alkyl radicals containing 1–4 carbon atoms, which polymers are prepared by polymerizing one or more di-substituted ketenes at low temperatures in the presence of strongly basic catalysts. These poly(enol esters) exhibit excellent physical characteristics making them eminently suited for spinning, casting or molding into good quality films, fibers and shaped articles. However, di-substituted ketenes, which are employed in the preparation of the poly(enol esters) according to the process of the aforementioned copending application, are unstable compounds and tend to form peroxides at the low temperatures employed in the polymerization. It is therefore evident that it would be desirable to prepare the poly(enol esters) from compounds free from such disadvantages.

Accordingly, it is an object of this invention to provide a novel process for preparing the very valuable poly(enol esters) described above.

Another object of this invention is to prepare poly(enol ester) from compounds which are more stable and less volatile than the di-substituted ketens employed heretofore.

Another object of this invention is to prepare poly(enol esters) from tetra-substituted β-lactones.

Still another object of this invention is to provide a convenient, commercially feasible process for the polymerization of tetra-substituted β-lactones to form poly(enol esters) in the presence of strongly basic catalysts.

Other objects and advantages of the invention will become apparent from an examination of the description and claims which follow.

In accordance with this invention, it has been found that poly(enol esters) can be obtained by polymerizing tetra-substituted-3-hydroxy-3-butenoic acid β-lactones at temperatures in the range of about −80° to about 200° C., in the presence of catalytic amounts of strongly basic polymerization catalysts, as hereinafter described.

The discovery that tetra-substituted-3-hydroxy-3-butenoic acid β-lactones can be polymerized to form the very valuable high molecular weight poly(enol esters) described in the aforementioned copending application was quite surprising since it could not have been predicted from the prior art. Thus, although some β-lactones have been polymerized to form polyesters, prior art workers have been unsuccessful in their attemps to prepare high molecular weight polymers from γ-substituted-β-lactones.

Although the lactones employed in this invention are dimers of di-substituted ketenes, their properties are surprisingly different from those of such β-lactone dimers as diketene and dimers of monoalkyl ketenes. Hence, the compounds employed in the process of this invention are sufficiently reactive for synthetic work but are much more stable than diketene and are less dangerous to handle and less susceptible to deterioration in storage. Furthermore, diketene readily polymerizes upon standing at room temperature while the β-lactones employed in this invention can be stored at normal temperatures for long periods without polymerizing. In addition, when diketene is reacted in a solvent which contains a small amount of a basic catalyst such as sodium ethylate at 70–120° C., dehydroacetic acid is obtained in yields of 60–80% [Ind. Eng. Chem., 32, 21 (1940)]. In contrast, the 2,2,4,4-tetra-substituted-3-hydroxy-3-butenoic acid β-lactones under similar conditions give no compounds analogous to dehydroacetic acid.

The tetra-substituted-3-hydroxy-3-butenoic acid β-lactones that are employed in the process of this invention are represented by the following structural formula:

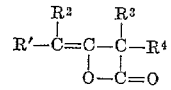

wherein R′, R², R³ and R⁴ are the same or different alkyl radicals containing from 1 to 4 carbon atoms. Suitable alkyl radicals include, for example, methyl, ethyl, propyl, isopropyl, butyl, etc. In addition, the R substituents can be aryl, alkaryl, aralkyl, or alkyl radicals containing more than 4 carbon atoms, or the pair of substituents R′ and R² and the pair of substituents R³ and R⁴ can also be joined to form alkylene groups which, with the carbon atoms to which they are attached, form a 5 or 6 membered carbocylic ring. Suitable alkylene groups include, for example, tetramethylene or pentamethylene. These β lactones have not previously been disclosed in the prior art. However, the compounds themselves and methods of preparing them are disclosed in copending U.S. application Serial No. 108,739, now Patent No. 3,062,837, filed concurrently herewith, to Raymond D. Clark, and copending application Serial No. 108,740 filed concurrently herewith, to Edward U. Elam.

Copending application Serial No. 108,739, now Patent No. 3,062,837 discloses a method of preparing the β-lactones used in the process of this invention which method comprises contacting a tetraalkyl-1,3-cyclobutanedione in which the alkyl groups contain from 1 to 4 carbon atoms, with a catalytic amount of a Lewis acid and recovering the corresponding 2,2,4,4-tetraalkyl-3-hydroxy-3-butenoic acid β-lactone. The reaction is usually carried out in the range of 40° to 300° C. According to copending application Serial No. 108,740 the novel β-lactones are prepared by contacting di-substituted ketenes of the structure

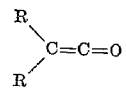

wherein the R groups are alkyl radicals containing 1 to 4 carbon atoms or are joined to form alkylene radicals containing 4 to 6 carbon atoms, with a strongly basic polymerization catalyst such as an alkali metal alkoxide in an inert solvent to obtain solid polymer. This polymer is then decomposed by pyrolysis to give the β-lactone. Compounds such as 2,2,4-trimethyl-3-hydroxy-3-pentenoic acid β-lactone and 2,4-dimethyl-3-ethyl-3-hydroxy-3-hexenoic acid β-lactone can be employed in the process according to this invention with excellent results. Furthermore, the starting material used in the polymerization process can be a mixture of 2 or more tetra-substituted-3-hydroxy-3-butenoic acid β-lactones, in any molar ratio, in which case the resulting polymer will have various combinations of $C_1$–$C_4$ alkyl groups present.

The polymerization process according to this invention is carried out in the presence of a strongly basic catalyst. The catalysts are employed in catalytic amounts ranging from about 0.05 to 5% and more preferably about 0.1 to about 5%, by weight, based on monomer. Suitable catalysts are strongly basic compounds of metals from Groups IA, IIA or IIIA of the Periodic Chart ("Handbook of Chemistry," Lange, 9th edition, Handbook Publishers, Inc., pages 56 and 57). Included within this group of metals are lithium, potassium, sodium, cesium, magnesium, calcium, barium, aluminum and the like. Good results are obtained with the metal alcoholates or alkoxides of the aforementioned metals, as exemplified by sodium, potassium or lithium methoxide, ethoxide, propoxide, butoxide and the like. In addition, other strongly basic compounds of these metals which give good results are alkali metal hydroxides and metal alkyls and aryl, as exemplified by calcium hydroxide, sodium hydroxide, potassium hydroxide, aluminum ethoxide, aluminum isopropoxide, butyl lithium, phenyl lithium and sodium amyl. Still other catalysts that can be used in the process of this invention are strongly basic quaternary ammonium hydroxides, such as trimethylbenzylammonium hydroxide and the like.

The temperatures employed in the polymerization process embodied in this invention are subject to wide variation and depend, to a large extent, upon the nature and reactivity of the monomer being polymerized as well as upon the nature and concentration of the catalyst employed. In general, however, it has been found that temperatures in the range of about −80° to about 200° C. will give good results, although temperatures in the range of about −60° to about 110° C. are preferred. The pressures employed, if any, should be such that at the temperature of operation at least some of the reaction mixture is in liquid phase.

The polymerization process embodied in this invention can be carried out batchwise or in a continuous flowing stream process. A continuous process is preferred for economic reasons, and paritcularly good results are obtained using continuous processes wherein a polymerization mixture of constant composition is continuously and progressively introduced into the polymerization zone and the mixture resulting from the polymerization is continuously and progressively withdrawn from the polymerization zone. The reaction time is dependent upon a number of variables including catalyst concentration, temperature, and molecular weight of the polymer formed. However, the reaction can generally be run for periods of at least 0.05 to about 5 hours or more, with the preferred reaction time being about 0.2 to about 1 hour.

The polymerization reaction is carried out in the absence of, or presence of, a solvent which facilitates contact between the catalyst and the starting material and aids in temperature control. The solvent can be any of the well known inert liquid organic solvents which do not freeze at the temperatures employed in the polymerization process and which do not react with either the reactants or the catalysts employed. In general, esters, ethers, hydrocarbons and halogenated hydrocarbons can be used with good results. Some typical inert liquid organic solvents which can be employed in the process of this invention include, benzene, toluene, xylene, methylene chloride, methyl chloride, pentane, cyclohexane, hexane, ethyl ether, isopropyl ether, dioxane, tetrahydrofuran, tetrahydropyran, ethyl acetate and the like. The polymer can be separated from the solvent by precipitation with a non-solvent, e.g. methanol, followed by filtration and drying at elevated temperatures.

This invention can be further illustrated by the following examples of preferred embodiments thereof although it will be understood that these examples are included merely for purposes of illustration and are not intended to limit the scope of the invention unless otherwise specifically indicated:

Example 1

As already indicated, tetra-substituted-3-hydroxy-3-butenoic acid β-lactones can be polymerized in the presence of a base to form valuable poly(enol esters). Thus, 30.0 g. of the β-lactone of 2,2,4-trimethyl-3-hydroxy-3-pentenoic acid is heated with 0.5 g. of sodium hydroxide at 170° C. After 5 minutes of boiling at a temperature of 170–195° C. the thick syrupy liquid is poured into acetone whereby the liquid dissolves and the polymer precipitates as a white powder. The polymer is removed and dried at 100–110° C. for 30 minutes and has a melting point of 191–197° C.

Example 2

To further illustrate the invention, 100 g. of the β-lactone of 3-hydroxy-2,2,4-trimethyl-3-pentenoic acid is added gradually, under nitrogen, to a stirred refluxing suspension of 5 g. of sodium methoxide in 500 ml. of ethyl ether. After about 1 hr., solid polymer separates. The polymer is removed by filtration and washed twice with 500 ml. of water with vigorous agitation in a Waring Blendor. The polymer weighs 85.4 g. and melts at 198–200° C.

Example 3

The procedure of Example 2 is repeated with refluxing toluene rather than ether as the solvent. The resulting polymer melts at approximately 175° C.

Thus, by the practice of this invention, there is provided a novel process for the preparation of poly(enol esters) which eliminates the disadvantages encountered when disubstituted ketenes are used for this same purpose. The polymers prepared according to the process of this invention are thermally stable at elevated temperatures and can be spun into fibers of excellent quality, cast into tough films, or molded by conventional spinning, casting or molding techniques. A convenient method for preparing a film is to dissolve the polymer, for example, the polymer prepared according to Example 1, in a solvent such as methylene chloride and then evaporate the solvent. Fibers can be conveniently spun from a polymer melt of the polymers prepared according to the process of this invention. Furthermore, the presence of the ethylenic double bond in these polymers makes crosslinking possible and, therefore, makes the polymers useful in the preparation of varnishes, lacquers, etc. When used for such purposes, a solution of the polymer in an aromatic hydrocarbon is brushed or sprayed onto a substrate, for example, wood or metal. Evaporation of the solvent leaves a tough, clear film.

Although the invention has been described in considerable detail with reference to certain preferred embodiments thereof, it will be understood that variations and modifications can be effected without departing from the spirit and scope of the invention as described hereinabove and as defined in the appended claims.

I claim:
1. A process for the preparation of a poly(enol ester) which comprises contacting a 2,2,4-tetraalkyl-3-hydroxy-3-butenoic acid β-lactone in which the alkyl groups contain 1–4 carbon atoms, at a temperature in the range of about −80° to 200° C., with at least a catalytic amount of a strongly basic catalyst effective to polymerize said β-lactone.
2. A process for the preparation of a poly(enol ester) which comprises contacting a 2,2,4-tetraalkyl-3-hydroxy-3-butenoic acid β-lactone in which the alkyl groups contain from 1–4 carbon atoms, at a temperature in the range of about −80° to 200° C., with at least a catalytic amount of a strongly basic compound of a metal effective to polymerize said β-lactone, said metal being a member selected from Groups IA, IIA and IIIA of the Periodic Table.

3. A process for the preparation of a poly(enol ester) which comprises contacting a 2,2,4,4-tetraalkyl-3-hydroxy-3-butenoic acid β-lactone in which the alkyl groups contain 1–4 carbon atoms, at a temperature in the range of about −60° to about 110° C., with at least a catalytic amount of a strongly basic catalyst effective to polymerize said β-lactone.

4. A process for the preparation of a poly(enol ester) which comprises contacting a 2,2,4,4-tetraalkyl-3-hydroxy-3-butenoic acid β-lactone in which the alkyl groups contain 1–4 carbon atoms, at a temperature in the range of about −60° to about 110° C., with at least a catalytic amount of a strongly basic compound of a metal effective to polymerize said β-lactone, said metal being a member selected from Groups IA, IIA and IIIA of the Periodic Table.

5. A process for the preparation of a poly(enol ester) which comprises contacting a 2,2,4,4-tetraalkyl-3-hydroxy-3-butenoic acid β-lactone in which the alkyl groups contain 1–4 carbon atoms, at a temperature in the range of about −60° to about 110° C., with at least a catalytic amount of sodium methoxide.

6. A process for the preparation of a poly(enol ester) which comprises contacting a 2,2,4,4-tetraalkyl-3-hydroxy-3-butenoic acid β-lactone in which the alkyl groups contain 1–4 carbon atoms, at a temperature in the range of about 110° to 200° C., with at least a catalytic amount of sodium hydroxide.

7. A process for the preparation of a poly(enol ester) which comprises contacting 2,2,4-trimethyl-3-hydroxy-3-pentenoic acid β-lactone at a temperature in the range of about 110° to 200° C., with at least a catalytic amount of sodium hydroxide.

References Cited by the Examiner
UNITED STATES PATENTS

| | | | |
|---|---|---|---|
| 2,675,392 | 4/54 | Theobald | 260—343.9 |
| 3,004,070 | 10/61 | Hartle | 260—590 |
| 3,021,314 | 2/62 | Cox | 260—78.3 |

OTHER REFERENCES

Noller: "Chemistry of Organic Compounds," Philadelphia, pub. by Saunders Co., 1958, 2nd ed. (pages 762 and 824 relied upon).

LEON J. BERCOVITZ, *Primary Examiner.*

JOSEPH L. SCHOFER, *Examiner.*